United States Patent Office 3,291,867
Patented Dec. 13, 1966

3,291,867
PHOSPHORUS PENTOXIDE-POLYOL FUSION
REACTION PRODUCTS
Daniel Shew, Metuchen, N.J., and Bernard W. Greenwald, Bronx, N.Y., assignors to Merck & Co., Inc., Rahway, N.J., a corporation of New Jersey
No Drawing. Filed Nov. 19, 1962, Ser. No. 238,775
16 Claims. (Cl. 260—953)

This invention relates to novel polyurethane foamable compositions and more particularly to novel compositions useful in preparing flame retardant or flame resistant polyurethane foams. Specifically, it relates to new compositions containing, in chemical combination, phosphate groups and polyhydric alcohol residues and to the novel foams produced therefrom.

Polyurethane foams have been extremely useful in many areas since their discovery. One disadvantage of such urethane foams is, however, their tendency to burn and propagate flame. One method used to overcome this problem involves incorporating within the foam certain fire retardant ingredients. These are generally incorporated into a composition prior to foaming in the form of chlorinated compounds or phosphorous compounds known to impart fire retardant characteristics to the subsequently produced foam. The fire retardants are therefore merely additives not chemically integrated within the foam. In consequence of this, the fire retardant properties of the foams suffer the disadvantage of being susceptible to conditions detrimental to the additives alone which conditions would not otherwise be derimental to the foam. Such conditions as degradation in high humidity surrounds, evaporation, leaching, and problems of instability are typical of those encountered.

Another method has been the inclusion of small amounts of halogenated polyethers or polyesters, of the order of two or three percent, in with the dominant polyol and the subsequent reaction of this mixture with a diisocyanate and a foaming agent. Such a procedure results in a correspondingly small percentage of the foam containing chemically combined fire retardants while the dominant foam constituents are not chemically united with the fire retardant. The prohibitive cost of the fire retardant ingredients have been a great factor in limiting the commercial acceptance of this procedure.

It is therefore, an object of this invention to provide a foamable composition useful in preparing flame resistant foams wherein the flame retardant is chemically combined with a dominant amount of a foam constituent.

It is another object of this invention to provide flame retardant polyurethane foams not dependent upon additives for flame resistant properties.

Another object is to provide low cost foamable compositions useful in preparing flame resistant foams.

These and other objects will become apparent when consideration is given to the following detailed disclosure.

The foamable compositions of the present invention, having the aforementioned advantageous characteristics are phosphate esters of a polyol having from three to seven carbon atoms, wherein the phosphate content ranges from about 33–80 mole percent, based on the total composition. Of the total phosphate content, about 55–98 percent is present as the dibasic phosphate (also designated monoalkyl phosphate), and about 2–45 percent is present as the monobasic phosphate (also designated dialkyl phosphate), each determined by potentiometric titration. The compositions are further characterized in that they exhibit an acid number of from 200–800, and a hydroxyl number of from 200–1200. The preferred compositions have a phosphate content of from 50–66 mole percent, of which 60–80 percent is in the form of the dibasic phosphate and 20–40 percent is in the form of the monobasic phosphate; an acid number of from 200–600; and a hydroxyl number of from 400–1000. The phosphate groups are chemically linked to the polyol at an oxygen atom of an alcoholic hydroxyl group. As used herein, the term "polyol" is meant to include polyethers and polyesters which contain free hydroxyl groups as well as alcohols in which the hydroxyl groups are neither etherified nor esterified.

The compositions of the present invention may be prepared by reacting a polyol having from three to seven carbon atoms and from three to seven hydroxyl groups with phosphorus pentoxide. The reaction is carried out by fusion of the solid materials employing a mole ratio of phosphorus compound to polyol of between 0.25:1–2:1 and preferably between 0.5:1–1:1. Although it is suitable to add the phosphorus compound to the molten polyol in the proper proportions, it is preferred to carry out the process by adding a solid mixture of the phosphorus compound and polyol to a molten portion of the polyol. In this manner, the reaction may be effected with minimum of inconvenience caused by the exothermic nature of the reaction.

The polyols used may be any of those which are normally used in the preparation of polyurethane foams, having from three to seven carbon atoms and from three to seven free hydroxyl groups. The ultimate selection of the particular polyol will be dependent upon the requirements of the foam. For example, flexible foams may be obtained with lower hydroxyl number polyols and rigid foams may be obtained with polyols having higher hydroxyl numbers. Illustrative of the suitable polyols having no substituted hydroxyl groups are sorbitol, mannitol, pentaerythritol, trimethylol propane, glycerine, α-methyl glucoside and mixture of these, particularly mixtures of sorbitol and mannitol; illustrative of suitable polyols having esterified hydroxyl groups are the reaction products of the foregoing with such carboxylic acids as maelic, adipic, phthalic acids and the like; illustrative of suitable polyols having etherified hydroxyl groups are reaction products of the foregoing list of unsubstituted polyols with epoxides such as propylene oxide, ethylene oxide, butylene oxide and the like.

The actual amount of phosphorous compound used in preparing the compositions of this invention will depend upon the physical characteristics and the properties of the resulting reaction mass. For example, at levels exceeding about a 1 to 1 molar ratio of phosphorus pentoxide to polyol, the reaction mass tends to become extremely viscous with those polyols possessing hydroxyl numbers of the order of 800 and higher, thereby posing processing inconveniences. It is therefore, preferred to employ between 0.5–1.0 mole of phosphorous compound per mole of such polyols as sorbitol, mannitol, pentaerythritol, trimethylol propane and esterfied and etherfied derivatives thereof. For those polyols having lower hydroxyl numbers, a ratio of about 0.5:–1.5:1 will be suitable.

The temperature at which the phosphorous compound and the polyol are reacted is that at which the polyol is molten. However, care should be taken to avoid temperatures which result in the degradation of the polyols employed. For example, both sorbitol and mannitol tend to dehydrate at temperatures much above 100° C. Therefore, when using these polyols, a preferred reaction temperature is in the range of from 85 to 100° C. for sorbitol and from 100–120° C. for mannitol once the reaction at the molten temperature is initiated. Where the problem of dehydration is not present as in the case of trimethylol propane, and pentaerythritol, for example, or for normally liquid polyols, any temperature which does not result in other decomposition and at which the reaction proceeds will be suitable. In general, temperatures in the range of from 80 to 200° C. produce beneficial results.

As previously indicated, the compositions of the present invention are acidic. It will be appreciated by those skilled in the art that in order to produce foams from acidic but otherwise foamable compositions, the acid functions of the composition must be neutralized prior to foaming. Therefore, the compositions of the invention should be altered prior to foaming by reacting them with materials known in the art to be useful in neutralizing acid functions such as epoxides, amines, metal hydroxides and the like. Thereafter, the neutralized composition may be reacted in a conventional manner to obtain foams. For example, they may be further reacted with epoxides such as propylene oxide, ethylene oxide, butylene oxide, and the like in order to obtain compositions having a more desirable hydroxyl number, or they may be reacted with a carboxylic acid such as, adipic acid, maleic acid, phthalic acid and the like, after which, in any case, they may then be reacted with an organic diisocyanate in the presence of a blowing agent and a cross-linking catalyst to form a foam.

The following examples are given for purposes of illustration.

EXAMPLE 1

Sorbitol phosphate

In a 100 ml. resin kettle, equipped with stirrer, $N_2$ inlet (in order to purge the system before starting), thermometer and enclosed powder addition set up, 45.5 grams of powdered sorbitol are melted and brought to 95° C. with an oil bath. To the molten sorbitol, a mixture consisting of a blend of 45.5 grams powdered sorbitol and 35.5 grams $P_2O_5$ is added slowly and carefully over a 1½ hour period. Too fast an addition will result in a violent exothermic reaction. The amounts of starting materials represent a sorbitol:$P_2O_5$ ratio of 2:1. During the addition the temperature is maintained between 85° C. and 100° C. After the final addition is made, the mixture is heated at 95° C. for an additional two hours (with stirring). The resulting chocolate brown material is dissolved in approximately 300 ml. boiling methanol and then treated with activated charcoal. The resulting light yellow solution is then dried over $MgSO_4$ and stripped of solvent. The product is a very viscous tan oil having the following characteristics:

a. Acid number 339
b. Hydroxyl number 959 (corrected)
c. The titration curve (potentiometric) indicates the presence of approximately 35% monobasic phosphate and 65% dibasic phosphate groups.

When the above procedure is repeated using an equivalent amount of a mixture of 85 percent sorbitol and 15 percent mannitol, similar results are obtained.

EXAMPLE 2

Preparation of foam from Example 1

20 grams of the product of Example 1, in a three-necked flask, equipped with Dry Ice condenser, thermometer, dropping funnel, and magnetic stirrer, mixed with 100 ml. methanol and 2 ml. triethylamine are brought to a boil. To this system, via the dropping funnel, 43 grams of propylene oxide are slowly added until the temperature of the refluxing liquid begins to drop, and the solution is neutral to hydrion paper. The system is allowed to reflux for an additional half hour, after which, the solvent is stripped. The product is a yellow oil having a hydroxyl number of 860 (corrected). To reduce the hydroxyl number further, a 300 ml. autoclave equipped with a Lapp pulsa-feeder is charged with 70 grams of this product and 0.5 gram of NaOH. The system is purged with $N_2$, pressurized to 40 p.s.i. and heated to 140° C. at which point propylene oxide is metered into the pressure reactor at a rate of between 0.7–1.1 ml./minute. The addition requires two hours after which 30 grams of propylene oxide is found to be reacted with 70 grams of starting material. The product is then treated with Dowex 50W–X4 (strong cationic sulfonated polystyrene ion exchange material on hydrogen cycle) to remove any NaOH present, decolorized with charcoal, and dried over $MgSO_4$. The final material, a tan oil has a hydroxyl number of 574.

In a 250 ml. beaker, the following materials are mixed thoroughly:

a. 10 grams of oxypropylated product from above
b. 0.2 gram of silicone oil (Carbide-L520)
c. 0.5 gram Freon 11
d. 8.8 grams toluene diisocyanate.

To this mixture, 0.3 gram methyl morpholine are added and a satisfactory foam develops within one minute. The foam is cured at 70° C. for one hour and is found to be self-extinguishing after the flame of a Bunsen burner is applied to ignite and then withdrawn from the sample.

EXAMPLE 3

Sorbitol phosphate

The procedure of Example 1 is followed using 86 grams of sorbitol in reaction with a mixture of 100 grams of sorbitol and 142 grams of $P_2O_5$. The sorbitol:$P_2O_5$ molar ratio is 1:1. The final material, an extremely viscous amber oil has the following characteristics:

a. Acid number of 490
b. Hydroxyl number 650 (corrected)
c. 25% monobasic phosphate and 75% dibasic phosphate groups by potentiometric titration.

When the above product is oxypropylated to reduce its hydroxyl number to about 557 and foamed according to the procedure of Example 2, it is found to be self-extinguishing. The flame test employed corresponds to ASTM D–635. In the test, a slab of foam 5″ x 2″ x ½″ is placed on a wire screen and ignited with the blue cone of a wing tip burner. The burner is removed after ignition of the foam and the foam is then designated as self-extinguishing if it does not propagate more than four inches along the axis of the foam. It is designated as non-burning if the foam fails to ignite.

EXAMPLE 4

Trimethylol propane phosphate

In a 100 ml. resin kettle, 46.5 grams of trimethylol propane are melted and brought to 85° C. The system is then purged with nitrogen and maintained under a constant nitrogen flow. To this melt, a mixture of 46.5 grams of trimethylol propane and 35.5 grams of $P_2O_5$ is added over a 45 minute period. The exotherm is not as marked as in Example 1 and temperature control is easier to maintain. The temperature is maintained between 80–100° C. during the addition. After the addition, the mixture is heated for three hours at 90° C. The resulting chocolate brown syrup is worked-up as in Example 1. The material has the following characteristics.

a. Acid number of 264
b. Hydroxyl number of 669 (corrected)
c. 25% monobasic phosphate and 75% dibasic phosphate as determined by potentiometric titration.

After reduction of the hydroxyl number to about 592 by oxypropylation, the above composition is foamed following the procedure of Example 2 and found to be self-extinguishing.

Similar results are obtained when the foregoing procedure is repeated using equivalent amounts of mannitol, glycerine or α-methyl glucoside in place of trimethylol propane, using a temperature of about 170–180° C. for α-methyl glucoside, about 85–100° C. for the glycerine, and an initial temperature of about 170–180° C. for mannitol with subsequent reduction of the temperature to about 120° C. after the reaction is initiated.

EXAMPLE 5

*Pentaerythritol phosphate*

The experimental procedure utilized is the same as that described in Example 1. To 46.5 grams of molten pentaerythritol at 230° C., a mixture of 46.5 grams of pentaerythritol and 35.5 grams $P_2O_5$ is added over a 1½ hour period. The final temperature after complete addition is 140° C. and the mixture is incubated at this temperature for two hours. The product, isolated as described in Example 1, has the following characteristics:

a. Acid number of 239
b. Hydroxyl number of 823 (corrected)
c. By potentiometric titration, 27% monobasic phosphate, 73% dibasic phosphate.

A foam prepared from the above material, after reduction of the hydroxyl number to about 498 by oxypropylation, is self-extinguishing.

EXAMPLE 6

*Phosphate esters of sorbitol polyethers*

To 93 grams of a sorbitol-polyether (reaction product between sorbitol and propylene oxide under pressure and basic conditions, and having a hydroxyl number of 485 and available under the name Niax Hexol LS485) 35.5 grams of $P_2O_5$ are added over a 35 minute period at 85–95° C. The addition is carried out in a resin kettle in the same manner as described in Example 1. The final mixture is heated for 14 hours at 85° C.

A foam prepared from the above composition in accordance with the procedure of Example 2, after oxypropylation of the composition to a hydroxyl number of about 377, is self-extinguishing.

When the above procedure is repeated using equivalent amounts of polyethers or polyesters of mannitol, pentaerythritol, trimethylol propane, glycerine, or α-methyl glucoside in place of the sorbitol polyether, similar results are obtained.

It will be appreciated by those skilled in the art that various changes and modifications may be made in carrying out the process herein described. All such changes and modifications as come within the scope of the invention are intended to be encompassed by the appended claims.

What is claimed is:

1. A composition of matter prepared by the fusion reaction of a polyol having from 3 to 7 carbon atoms and from 3 to 7 hydroxyl groups with phosphorus pentoxide in a phosphorus to polyol mole ratio of about 0.25 to from about 1 to about 2 to 1 and at a temperature of from about 80° C. to about 200° C., said composition of matter having a phosphate content of from 33–80 mole percent of which 55–98 percent is present as the dibasic phosphate and from 2–45 percent is present as the monobasic phosphate as determined by potentiometric titration; an acid number of from 200–800; and a hydroxyl number of from 200–1200; said polyol residue being derived from a polyol having from three to seven carbon atoms and from three to seven hydroxyl groups.

2. The composition according to claim 1 wherein the polyol residue is derived from sorbitol.
3. The composition according to claim 1 wherein the polyol residue is derived from mannitol.
4. The composition according to claim 1 wherein the polyol residue is derived from pentaerythritol.
5. The composition according to claim 1 wherein the polyol residue is derived from trimethylol propane.
6. The composition according to claim 1 wherein the polyol residue is derived from α-methyl glucoside.
7. The composition according to claim 1 wherein the polyol residue is derived from glycerine.
8. The composition according to claim 1 wherein the polyol residue is derived from mixtures of sorbitol and mannitol.
9. A composition of matter prepared by the fusion reaction of a polyol having from 3 to 7 carbon atoms and from 3 to 7 hydroxyl groups with phosphorus pentoxide in a phorphorus to polyol mole ratio of about 0.25 to from about 1 to about 2 to 1 and at a temperature of from about 80° C. to about 200° C., said composition of matter having a phosphate content of from about 55–66 mole percent of which about 60–80 percent is present as the dibasic phosphate and from about 20–40 percent is present as the monobasic phosphate as determined by potentiometric titration; an acid number of from 200–600; and a hydroxyl number of from 400–1000; said polyol residue being derived from a polyol having from three to seven carbon atoms and from three to seven hydroxyl groups.
10. The composition according to claim 9 wherein the polyol residue is derived from sorbitol.
11. The composition according to claim 9 wherein the polyol residue is derived from mannitol.
12. The composition according to claim 9 wherein the polyol residue is derived from pentaerythritol.
13. The composition according to claim 9 wherein the polyol residue is derived from trimethylol propane.
14. The composition according to claim 9 wherein the polyol residue is derived from α-methyl glucoside.
15. The composition according to claim 9 wherein the polyol residue is derived from glycerine.
16. The composition according to claim 9 wherein the polyol residue is derived from mixtures of sorbitol and mannitol.

References Cited by the Examiner

UNITED STATES PATENTS

| | | |
|---|---|---|
| 1,598,370 | 8/1926 | Goissedet. |
| 2,177,984 | 10/1939 | Harris _____ 260—461 XR |
| 2,435,905 | 2/1948 | Schaefer. |
| 2,911,379 | 11/1959 | Parker et al. _____ 260—2.5 |
| 2,999,823 | 11/1959 | Dombrow _____ 260—2.5 |
| 3,005,007 | 10/1961 | Fierce et al. _____ 260—461 |
| 3,053,878 | 9/1962 | Friedman et al. _____ 260—461 |

OTHER REFERENCES

Kosolapoff, "Organo-Phosphorus Compounds," John Wiley and Sons, New York, N.Y. (1950), pp. 220–223.

CHARLES B. PARKER, *Primary Examiner.*

DONALD E. CZAJA, *Examiner.*

J. KLOCKO, FRANK M. SIKORA, RICHARD L. RAYMOND, *Assistant Examiners.*